United States Patent
Isberner et al.

(10) Patent No.: US 11,394,750 B1
(45) Date of Patent: Jul. 19, 2022

(54) SYSTEM AND METHOD FOR GENERATING NETWORK SECURITY POLICIES IN A DISTRIBUTED COMPUTATION SYSTEM UTILIZING CONTAINERS

(71) Applicant: Red Hat, Inc., Raleigh, NC (US)

(72) Inventors: Malte Isberner, Mountain View, CA (US); Connor Gorman, Mountain View, CA (US); Wei Lien Dang, Mountain View, CA (US); Hillary Benson, Mountain View, CA (US); Connor Gilbert, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/805,208

(22) Filed: Feb. 28, 2020

(51) Int. Cl.
  *H04L 9/40* (2022.01)
  *H04L 43/067* (2022.01)
  *H04L 41/22* (2022.01)

(52) U.S. Cl.
  CPC .......... *H04L 63/20* (2013.01); *H04L 41/22* (2013.01); *H04L 43/067* (2013.01); *H04L 63/0236* (2013.01)

(58) Field of Classification Search
  CPC ..... H04L 63/0236; H04L 63/20; H04L 41/22; H04L 43/067
  See application file for complete search history.

(56) References Cited

U.S. PATENT DOCUMENTS

| | | | |
|---|---|---|---|
| 8,146,160 B2* | 3/2012 | Orr | H04L 63/08 713/168 |
| 9,317,304 B2 | 4/2016 | Collado et al. | |
| 9,524,214 B1 | 12/2016 | Isdal et al. | |
| 10,397,255 B1 | 8/2019 | Bhalotra et al. | |
| 2010/0023810 A1 | 1/2010 | Stolfo et al. | |
| 2010/0107180 A1 | 4/2010 | Ulrich | |
| 2010/0122343 A1 | 5/2010 | Ghosh et al. | |
| 2012/0210333 A1 | 8/2012 | Potter et al. | |
| 2013/0097659 A1 | 4/2013 | Das et al. | |
| 2014/0289807 A1 | 9/2014 | Collado et al. | |
| 2016/0072831 A1* | 3/2016 | Rieke | G06F 3/04842 726/1 |
| 2016/0094582 A1* | 3/2016 | Watson | H04L 63/168 726/1 |
| 2016/0099963 A1 | 4/2016 | Mahaffey et al. | |

(Continued)

OTHER PUBLICATIONS

Kim et al. "TOSCA-Based and Federation-Aware Cloud Orchestration for Kubernetes Container Platform". Appl. Sci. 2019, 9(1), 191. pp. 1-13. (Year: 2019).*

(Continued)

*Primary Examiner* — John M MacIlwinen
(74) *Attorney, Agent, or Firm* — Dority & Manning, P.A.

(57) ABSTRACT

A server has a processor and a memory connected to the processor. The memory stores instructions executed by the processor to collect operating signals from machines. The operating signals characterize establishing or closing a network connection associated with a designated application operating within a designated container. The designated container is an isolated process in user space designated by an operating system kernel. A network security policy that permits network connections based upon the operating signals collected is automatically generated.

14 Claims, 7 Drawing Sheets

(56) References Cited

U.S. PATENT DOCUMENTS

| | | | |
|---|---|---|---|
| 2017/0180399 A1 | 6/2017 | Sukhomlinov et al. | |
| 2017/0353496 A1 | 12/2017 | Pai et al. | |
| 2018/0019969 A1* | 1/2018 | Murthy | H04L 61/2007 |
| 2018/0157524 A1 | 6/2018 | Saxena et al. | |
| 2018/0219863 A1* | 8/2018 | Tran | H04L 63/06 |
| 2019/0318240 A1* | 10/2019 | Kulkarni | G06F 9/455 |
| 2019/0319987 A1* | 10/2019 | Levy | H04L 9/3265 |
| 2019/0342335 A1* | 11/2019 | Ni | G06F 9/44505 |
| 2020/0112487 A1* | 4/2020 | Inamdar | H04L 41/082 |
| 2020/0218798 A1* | 7/2020 | Kosaka | G06F 21/629 |
| 2021/0194931 A1* | 6/2021 | Parashar | H04L 63/104 |
| 2021/0250365 A1* | 8/2021 | Atkinson | H04L 41/22 |

OTHER PUBLICATIONS

Non-Final Office Action for U.S. Appl. No. 15/273,482, dated Jul. 17, 2018, 17 pages.
Final Office Action for U.S. Appl. No. 15/273,482, dated Feb. 11, 2019, 18 pages.
Notice of Allowance for U.S. Appl. No. 15/273,482, dated May 10, 2019, 9 pages.

* cited by examiner

SYSTEM AND METHOD FOR GENERATING NETWORK SECURITY POLICIES IN A DISTRIBUTED COMPUTATION SYSTEM UTILIZING CONTAINERS

FIELD OF THE INVENTION

This invention relates generally to computer and application security. More particularly, this invention relates to techniques for providing security in a distributed computation system utilizing application containers.

BACKGROUND OF THE INVENTION

Modern software applications are designed to be modular, distributed, and interconnected. Some advanced software systems go a step further and divide complex applications into micro-services. Micro-services refer to software architectures in which complex applications are composed of many small, independent processes communicating with one another. Micro-services enable unprecedented efficiency and flexibility. However, micro-services architectures create a host of new security challenges, so a new security solution is required. The ideal solution will leverage the advantages of the micro-services approach and properly protect both micro-services and traditional systems. As used herein, the term application includes a traditional monolithic code stack forming an application and a micro-services instantiation of an application.

Application containers provide compute capabilities that dramatically improve scalability, efficiency, and resource usage. Application containers are sometimes called containers, software containers, virtualization engines or operating-system level virtualization. Any such container packages an application and all of its dependencies as an isolated process in the user space of an operating system. An operating system kernel uses technologies, such as name spaces and cgroups to enforce isolation between containers.

Containers can be run in on-premises data centers, private cloud computing environments, public cloud computing environments and on both bare metal servers and virtual machines. Containers are designed to be portable across different computing infrastructure environments, isolate applications from one another and enable improved resource utilization and management.

A container orchestrator is a container management tool. More particularly, a container orchestrator automates deployment, scaling and management of services that containers implement. Kubernetes is an open source container orchestrator. Kubernetes defines a set of building blocks or primitives that collectively provide mechanisms that deploy, maintain and scale applications based on CPU, memory or custom metrics. Kubernetes defines resources as different types of objects. The basic scheduling unit in Kubernetes is a pod, which is one or more containers that are co-located on a host machine. Each pod in Kubernetes is assigned a unique pod Internet Protocol (IP) address within a cluster.

A Kubernetes workload is a set of pods that execute a function. The set of pods form a service defined by a label selector. Kubernetes provides a partitioning of resources into non-overlapping sets called namespaces. Namespaces are intended for use in environments with many users spread across multiple teams, projects or deployments.

A Kubernetes network policy is a specification of how groups of pods are allowed to communicate with each other and other network endpoints. These network policies are configured as YAML files. YAML is a human readable data serialization language commonly used for configuration files.

Securing containers, the applications that run within them, and the software infrastructure surrounding the containers is challenging. More particularly, configuring and implementing network security policies, such as network security policies expressed in YAML files, is challenging. Existing processes are manual and therefore labor intensive and prone to error. Accordingly, there is a need for an automated tool for generating network security policies in a distributed computation system utilizing containers.

SUMMARY OF THE INVENTION

A server has a processor and a memory connected to the processor. The memory stores instructions executed by the processor to collect operating signals from machines. The operating signals characterize establishing or closing a network connection associated with a designated application operating within a designated container. The designated container is an isolated process in user space designated by an operating system kernel. A network security policy that permits network connections based upon the operating signals collected is automatically generated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
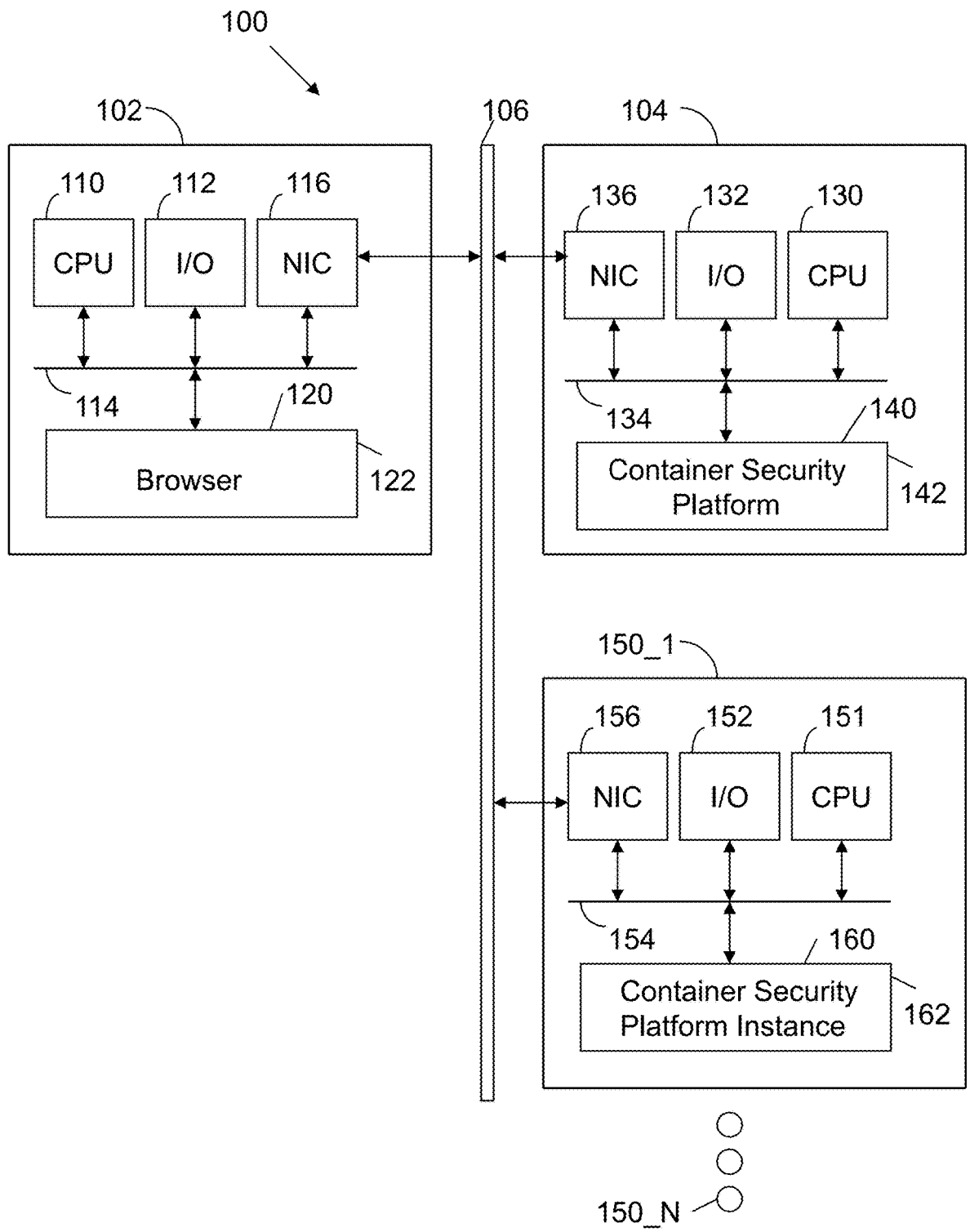
FIG. 1 illustrates a system configured in accordance with an embodiment of the invention.

FIG. 1 illustrates a system 100 configured in accordance with an embodiment of the invention. The system 100 includes a client machine 102 and at least one server 104 connected via a network 106, which may be any combination of wired and wireless networks. The client machine 102 includes standard components, such as a central processing unit or processor 110 and input/output devices 112 connected via a bus 114. The input/output devices 112 may include a keyboard, mouse, touch display and the like. A network interface circuit 116 is also connected to the bus to provide connectivity to network 106. A memory 120 is also connected to the bus. The memory 120 may store a browser 122, which may be used to access server 104. As discussed below, the client machine 102 may access server 104 to coordinate the automatic generation of network security policies and to obtain visualizations of network security analytics. The client device 102 may be a personal computer, tablet, smartphone, wearable device and the like.

Server 104 also includes standard components, such as a central processing unit 130, input/output devices 104, bus 134 and network interface circuit 136 to provide connectivity to network 106. A memory 140 is connected to the bus 134. The memory stores instructions executed by the central processing unit 130 to implement operations disclosed herein. In particular, the memory 140 stores a container security platform (CSP) 142 to implement operations disclosed herein. The container security platform 142 is operative with container security platform instances 162 distributed across a set of machines 150_1 through 150_N. The term container security platform instance is used to denote that any such instance may be a full container security platform or a sub-set of the functionality associated with a full container security platform. Any of machines 104 and 150_1 through 150_N may be either a physical or virtual machine. The container security platform 140 and container security platform instances run alongside applications executed within containers.

Machine 150_1 also includes standard components, such as a central processing unit 151, input/output devices 152, bus 154 and network interface circuit 156. A memory 160 is connected to the bus 154. The memory 160 stores a container security platform instance 162, which includes instructions executed by the central processing unit 151 to implement operations disclosed herein.

Figure 2:
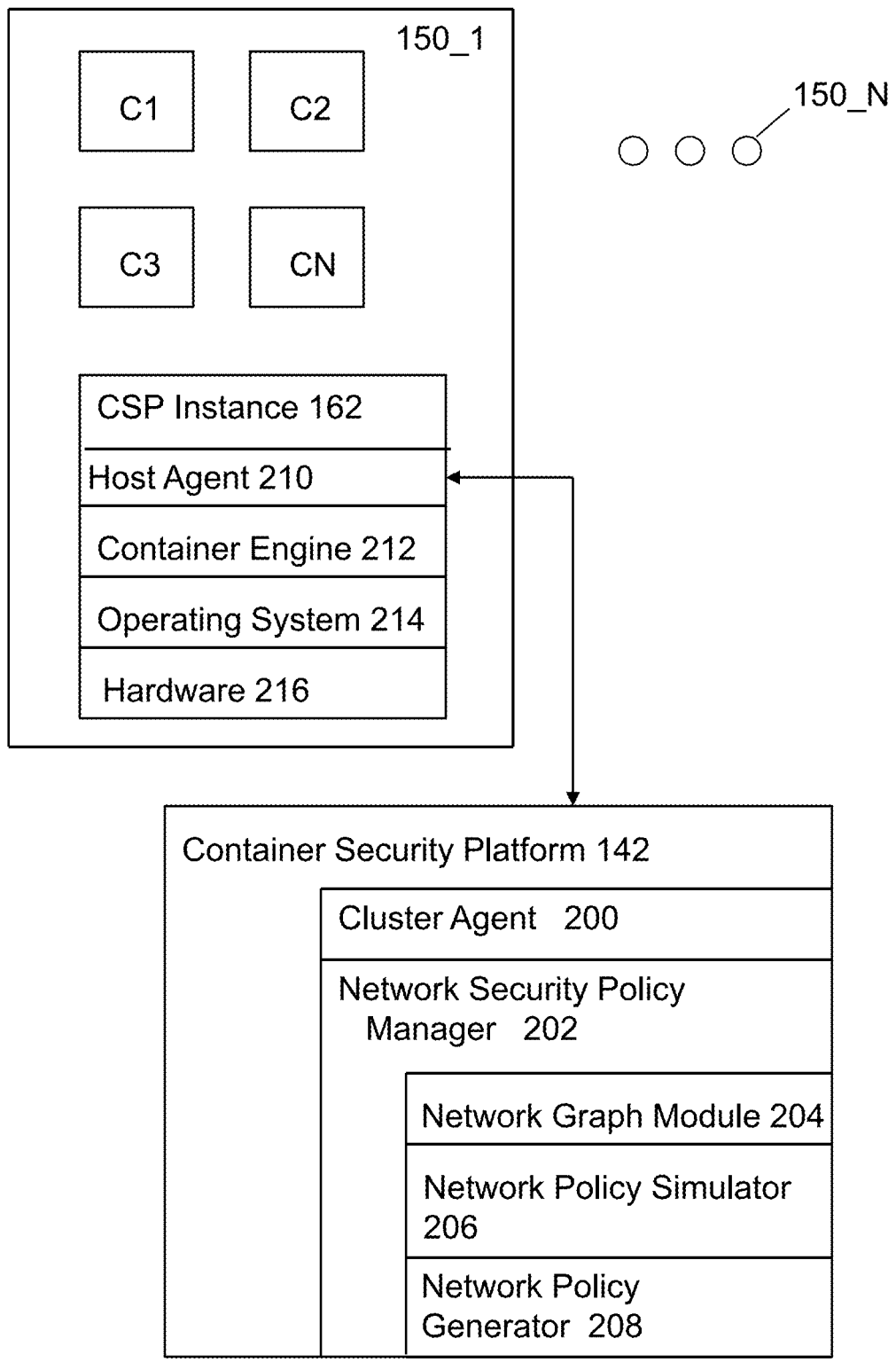
FIG. 2 is a more detailed characterization of certain components of FIG. 1.

FIG. 2 more fully characterizes certain components of FIG. 1. The figure illustrates machines 150_1 through 150_N. Machine 150_1 includes the container security platform instance 162, which operates in communication with a container engine 212, also commonly referred to as a container runtime. For example, the container engine 212 may be Docker®. Docker® is an open source project that automates the deployment of Linux applications inside software containers. The container engine 212 may also be the defined by the previously referenced Kubernetes container orchestrator.

The container engine 212 forms different containers C1, C2, C3, and CN on machine 150_1. Each container may execute a different application (including micro-services). Each container may also execute the same application for scalability, redundancy, availability or other reasons. Alternately, each container may execute the same application, but for different tenants in a multi-tenant environment. The container engine 212 is operative on top of operating system 214, which may be a host operating system, which executes on hardware 216 (e.g., CPU 130, memory 140, etc.), or a guest operating system, which executes on a hypervisor. The CSP instance 162 interacts with both the container engine 212 and operating system 214 and continuously or periodically sends and receives data to and from the container security platform 142.

Machine 150_1 also includes a host agent 210. The host agent monitors the activity of system calls that relate to the establishing or closing of network connections, targeting processes that are identified to be running in a container, and using this to build a per-host state of all current or recent outgoing network connections (with destination IP and port) for each container running on the host. The dynamic monitoring of network-related system call activity is complemented by an analysis of the current system state (made accessible by the Linux kernel via the proc filesystem) in order to identify outgoing network connections that were established before the host agent was deployed.

The container security platform 142 may include a number of modules. Each module may be implemented as a container or collection of containers. Thus, a set of containers that comprise the CSP is operative to analyze activity in other containers. The container security platform 142 includes a cluster agent 200.

The cluster agent 200 continuously monitors the orchestrator state and maintains information in a data structure that is preferably optimized for fast lookups and updates. In one embodiment, the information maintained by the cluster agent 200 includes an association of container IDs to orchestrator workload (e.g., deployment or daemonset). The maintained information may also include an association of IP as well as IP:port addresses to orchestrator workloads. One association is so-called "pod IPs" that correspond to the smallest schedulable units of which a workload is comprised. Another association is Service IPs, which are virtual IPs that get routed to workloads (any number of workloads, not limited to one). Another association is Node IPs, on which certain ports get routed to services (and thus workloads) by using an exposure type called NodePort.

The cluster agent 200 includes a correlation engine which, based on the above information, translates the set of outgoing network connections per container into a list of network connections between orchestrator workloads.

The container security platform 142 also includes a network security policy manager 202. In one embodiment, the network security policy manager 202 includes a network graph module 204. The network graph module 204 processes the list of network connections from the cluster agent 200 and builds a network graph out of this list. The network graph provides visibility and control over the allowed network connections. In one embodiment, the allowed network connections are defined by Kubernetes network policies.

An embodiment of the network security policy manager 202 also includes a network policy simulator 206. The network policy simulator 206 is configured to accept new network policy configuration files from the container security platform 142 and preview the network policies visually to confirm their accuracy before applying them.

An embodiment of the network security policy manager 202 also includes a network policy generator 208. The network policy generator is configured to generate a network policy configuration. In one embodiment, the network policy configuration is expressed in a configuration file, such as a YAML file. In one embodiment, this configuration is based on the network communication flow in a namespace within a specified period of time. That is, the network policy configuration permits those network connections between workloads that have been observed in a configurable window of time. The identification of workloads (along with the namespaces they reside in) is deduced from labels that are inferred from the orchestrator workload definitions.

Figure 3:
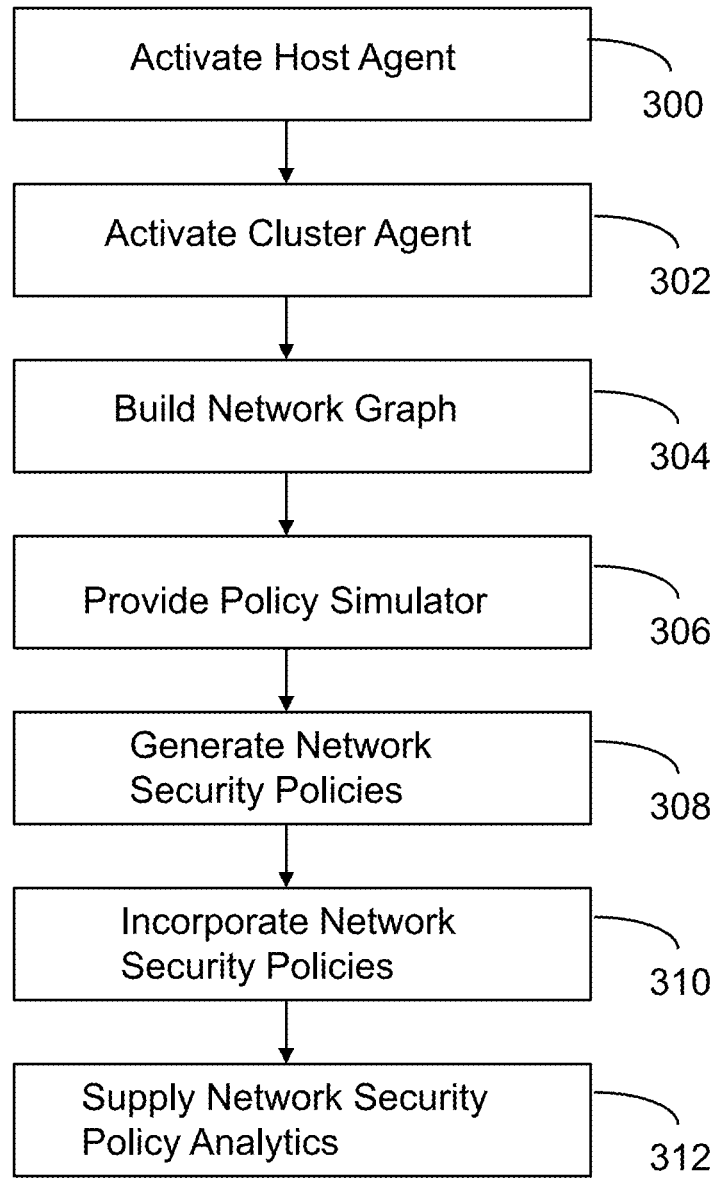
FIG. 3 illustrates processing operations performed in accordance with an embodiment of the invention.

FIG. 3 illustrates processing operations associated with an embodiment of the invention. The host agent 210 is activated 300 on one or more machines 150_1 through 150_N. The cluster agent 200 is activated 302 on the container security platform 142.

Figure 4:
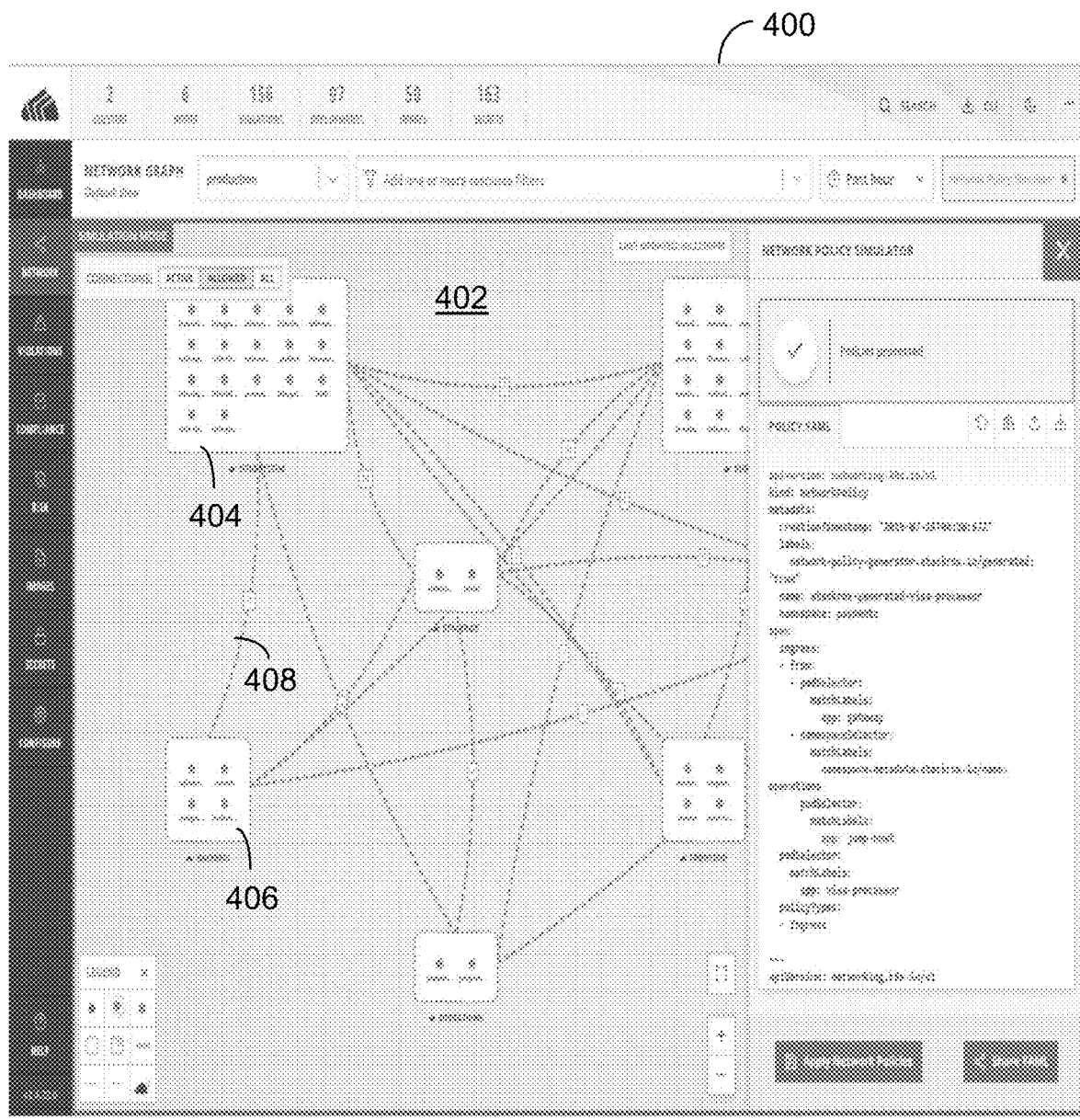
FIG. 4 illustrates an interface displaying a network graph and corresponding network security policy expressed in a YAML file format.

A network graph is built 304. The network graph module 204 may be used to implement this operation. FIG. 4 illustrates a user interface 400 with a network graph 402. The interface 400 may be viewed on a display associated with client device 102. The network graph 402 includes individual pods 404 and 406. A link 408 shows a communication pathway between individual pods 404 and 406. The graph may form a collection of pods and links that define a namespace.

The next operation of FIG. 3 is to provide a policy simulator 306. This operation may be implemented by the network policy simulator 206. A current network policy may allow unneeded network communications. The network policy simulator 206 is configured to simulate the effects of a new set of network policies. In one embodiment, interface 400 includes a Simulate Network Policy button. If the button is activated, the user is prompted to upload a network policy, which is then simulated. A collection of network policies may be generated by the container security platform 142. In one embodiment, the collection of network policies includes an allow database access policy, an allow ingress to and from a new resource policy, an allow same namespace access policy, an allow server to access policy, an internet access policy and a default deny all access policy.

Figure 5:
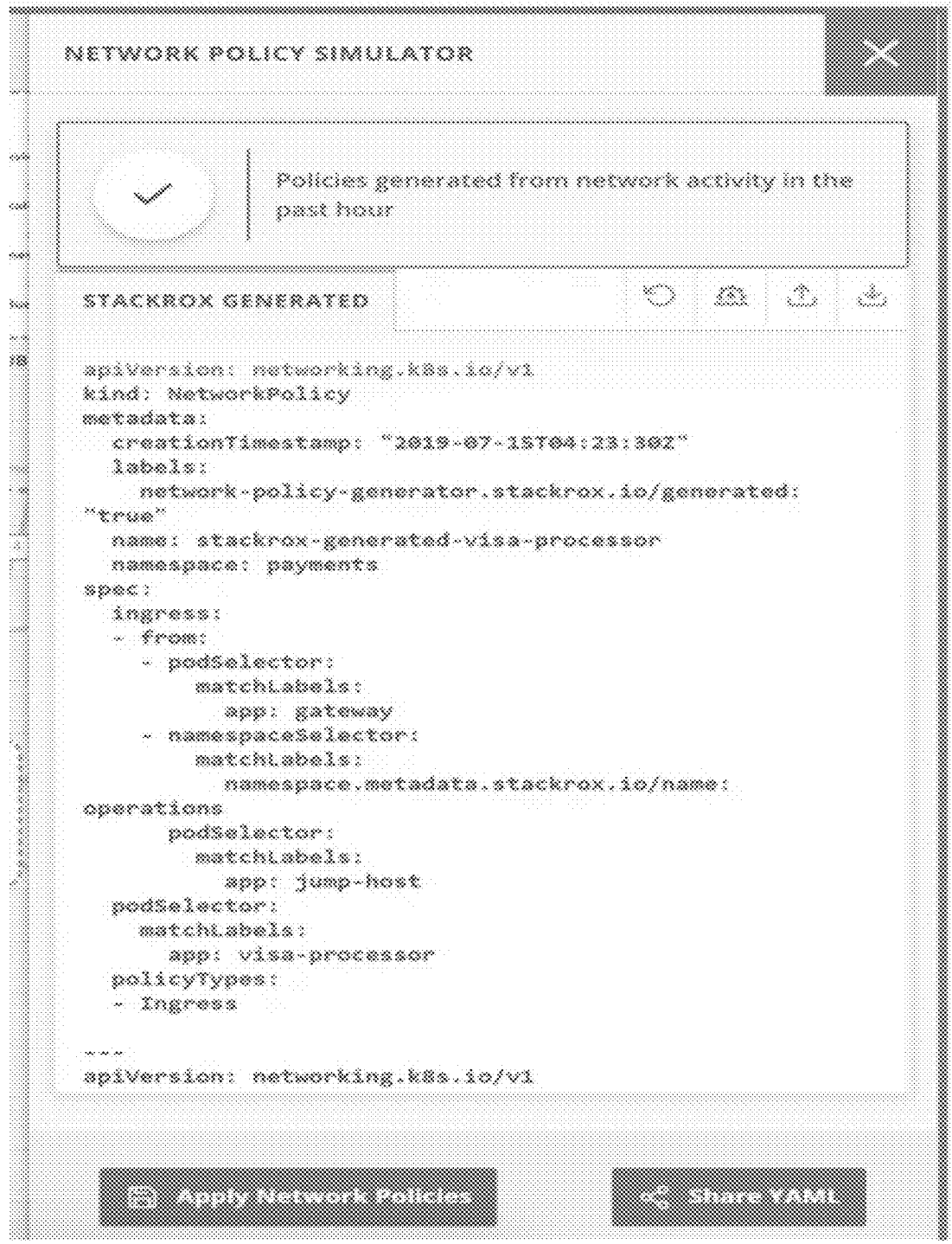
FIG. 5 is an example of a network security policy automatically constructed in accordance with an embodiment of the invention.

The next operation of FIG. 3 is to generate network security policies 308. This may be implemented with the network policy generator 208. A network security policy controls which pods receive incoming network traffic, and which pods can send outgoing traffic. By using network security policies to enable and disable traffic to or from pods, one can limit a network attack surface. FIG. 5 illustrates a generated network security policy that allows communication between specific groups of microservices.

In one embodiment, these network policies are YAML configuration files. It is often difficult to gain insights into the network flow and manually create these files. The network policy generator 208 automatically generates these policies based on the actual observed network communication flows in a deployment.

Network security policies may be generated from interface 400 of FIG. 4. The interface 400 may include a pull down menu that specifies different time windows, such as past hour, past 4 hours, past 8 hours, past day, past 2 days, etc. A time window is selected from such a menu. The generated policies apply to the deployments shown in the network graph 402. The generated policies allow all network traffic observed during the selected time. The interface 400 also includes a configuration panel that allows a user to specify whether the network security policy is for the deployment shown in graph 402 or for all deployments. In one embodiment, the network graph 402 shows the effects of the new network security policies.

The next operation of FIG. 3 is to incorporate network security policies 310. For example, the network security policy may be generated by container security platform 142 and then be downloaded to a container security platform instance 162 for application to Kubernetes. The network security policy may be generated by container security platform 142 and then be downloaded to a user system 102 for commitment to a version control system.

Figure 6:
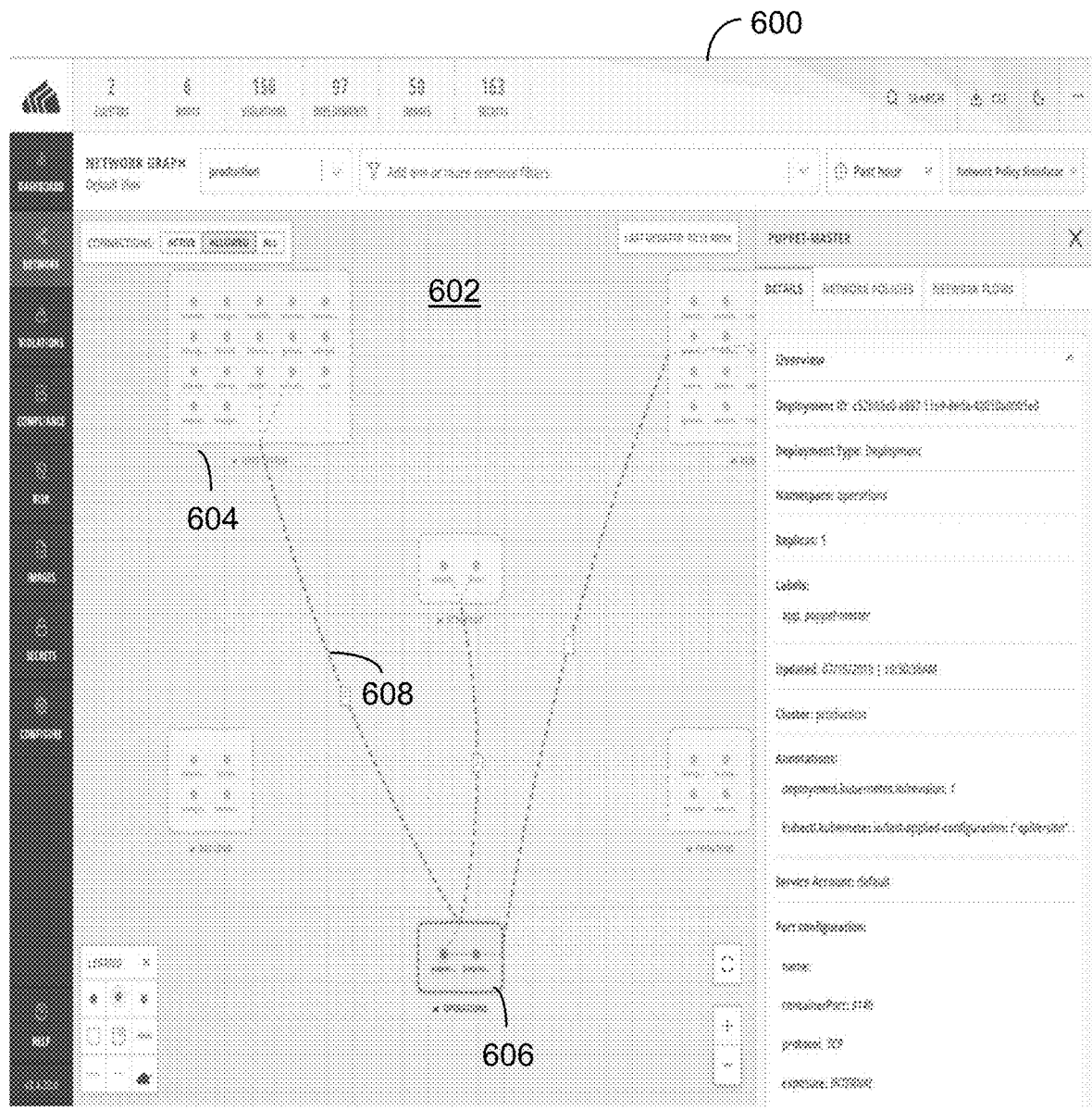
FIG. 6 illustrates an interface displaying a graph with allowed network connections.

The final operation of FIG. 3 is to supply network security policy analytics 312. FIG. 6 provides an interface 600 that displays network security policy analytics in the form of a graph 602 of allowed network connections. The graph 602 includes a first pod 604 associated with a second pod 606 via link 608. The link 608 may have indicia that specifies a direction of communication between the pods. In an embodiment, a user may click on link 608 to alter a parameter associated with the link (e.g., disable the link, limit traffic in a single direction, etc.).

Figure 7:
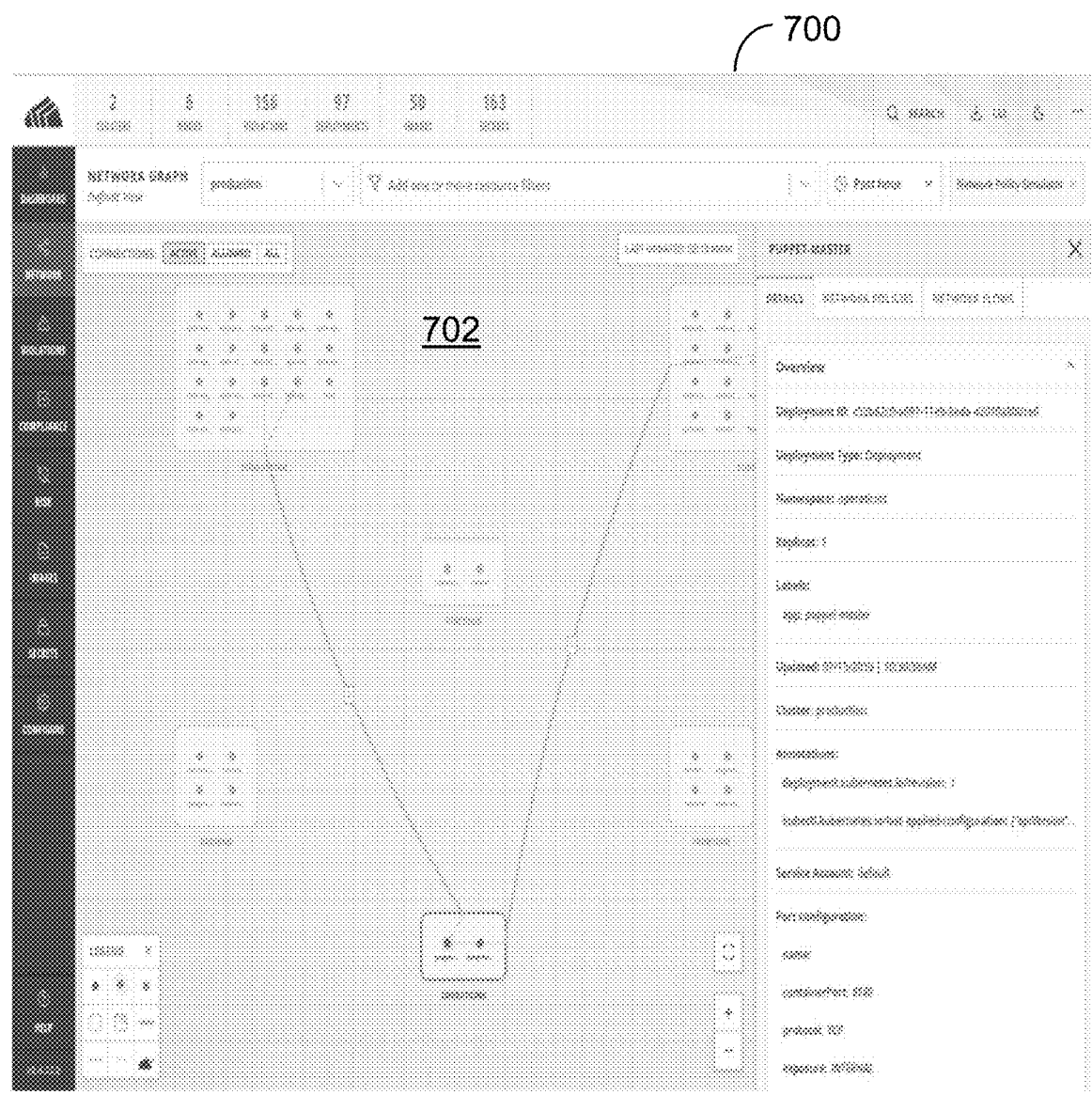
FIG. 7 illustrates an interface displaying a graph with active network connections.

FIG. 7 provides an interface 700 that displays network security policy analytics in the form of a graph 704 of active network connections.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a processor; and
a memory connected to the processor, the memory storing instructions executable by the processor to:
collect operating signals from a machine, wherein the operating signals characterize establishing or closing a network connection by each of a plurality of containers running on the machine in a same namespace, each container being an isolated process in user space designated by an operating system kernel;
generate, based on the operating signals, data that identifies a state of outgoing connections of each container of the plurality of containers running on the machine; and
automatically generate, based on the data, a network security policy that permits certain network connections to at least one container of the plurality of containers and prohibits other network connections to the at least one container of the plurality of containers.

2. The server of claim 1 wherein the operating signals are collected during a configurable window of time.

3. The server of claim 1 wherein the operating signals include a container identification within a container orchestrator workload.

4. The server of claim 1 wherein the operating signals include a pod Internet Protocol address.

5. The server of claim 1 wherein the operating signals include a service Internet Protocol address.

6. The server of claim 1 wherein the operating signals include a node Internet Protocol address for a node port.

7. The server of claim 1 wherein the operating signals include a node Internet Protocol address for a host port.

8. The server of claim 1 further comprising instructions executable by the processor to display a network graph characterizing interactions between networked resources.

9. The server of claim 1 further comprising instructions executable by the processor to simulate the network security policy.

10. The server of claim 1 further comprising instructions executable by the processor to supply network security policy analytics.

11. The server of claim 10 wherein the network security policy analytics include an allowed network connections graph.

12. The server of claim 10 wherein the network security policy analytics include an active network connections graph.

13. The server of claim 1 wherein the network security policy is expressed in a YAML file format.

14. A method comprising:

collecting, by a server comprising a processor and a memory connected to the processor, operating signals from a machine, wherein the operating signals characterize establishing or closing a network connection by each of a plurality of containers running on the machine in a same namespace, each container being an isolated process in user space designated by an operating system kernel;

generating, based on the operating signals, data that identifies a state of outgoing connections of each container of the plurality of containers running on the machine; and automatically generating, based on the data, a network security policy that permits certain network connections to at least one container of the plurality of containers and prohibits other network connections to the at least one container of the plurality of containers.

\* \* \* \* \*